United States Patent
Lin

(10) Patent No.: US 6,753,672 B2
(45) Date of Patent: Jun. 22, 2004

(54) ANODE STRUCTURE HAVING INCREASED CONTACT SURFACE AREA FOR METAL-AIR FUEL CELL BATTERY

(76) Inventor: Yung-Jen Lin, 8F, No. 12, Alley 30, Lane 358, Rueiguang Rd., Neihu Chiu, Taipei (TW), 114

( * ) Notice: Subject to any disclaimer, the term of this patent is extended or adjusted under 35 U.S.C. 154(b) by 16 days.

(21) Appl. No.: 10/178,358

(22) Filed: Jun. 25, 2002

(65) Prior Publication Data

US 2003/0235736 A1 Dec. 25, 2003

(51) Int. Cl.$^7$ ................................................. H01M 10/46
(52) U.S. Cl. ....................................................... 320/112
(58) Field of Search ................................. 320/101, 104, 320/112; 429/13, 26, 34

(56) References Cited

U.S. PATENT DOCUMENTS 5,196,276 A  *  3/1993  Niksa et al.
2002/0142201 A1  *  10/2002  Nelson

* cited by examiner

*Primary Examiner*—Edward H. Tso
(74) *Attorney, Agent, or Firm*—Rosenberg, Klein & Lee

(57) ABSTRACT

A metal-air fuel cell includes an anode and a cathode with an electrolyte between the anode and the cathode. The anode includes a plate-like body made of a composite anode plate including a reaction layer, a reaction-enhancing layer and a collector layer. A plurality of fins are formed on and extending from a surface of the anode plate. A plurality of openings are selectively defined in the anode plate in correspondence to the fins. The fins are arranged in an array with fins in adjacent rows aligned with each other or offset with respect to each other. The anode plate further includes a plurality of openings corresponding to each fin.

17 Claims, 8 Drawing Sheets

ANODE STRUCTURE HAVING INCREASED CONTACT SURFACE AREA FOR METAL-AIR FUEL CELL BATTERY

BACKGROUND OF THE INVENTION

1. Field of the Invention

The present invention relates generally to a metal-air fuel cell, and in particular to an anode structure of the metal-air fuel cell battery.

2. Description of the Prior Art

Batteries have been developed and widely used in a variety of fields. A variety of batteries are currently available, including lead-acid battery, zinc-manganese battery, nickel-cadmium battery, nickel-hydride battery, lithium ion battery, and metal-air fuel cell, such as zinc-air fuel cell battery. In recent year, emphasis has been placed on the metal-air fuel cell because of its high energy density and potential long shelf life. The overall reaction is oxidation of metal, such as zinc, and the reaction release electrons.

FIG. 1 of the attached drawings shows a conventional zinc-air fuel cell battery in which the anode comprises a zinc plate as the fuel of the battery. As shown, the battery comprises a zinc plate 1 as the anode arranged between cathode plates 2. Air 3 containing oxygen penetrates through the cathode plates 2 to enter the battery. Oxygen of the air reacts with the cathode plate 2 and becomes oxygen ions entering the electrolyte of the battery. The zinc plate 1 is positioned in the electrolyte and reacts with the electrolyte to release energy. The anode 1 and cathode 2 have terminals 10, 20 for external connection.

The surface area of the zinc plate of the zinc-air battery is a critical factor that affects the electrical performance of the battery. The larger the surface area of the zinc plate is, the larger the energy can be released at a predetermined time interval. This is still one of the major issues of the metal-air fuel cell to be addressed.

In addition, the conventional zinc-air fuel cell battery has a low energy density which causes problems in supply of large power. Thus, improving the zinc-air fuel cell battery in order to supply large power is another major issue to be addressed.

SUMMARY OF THE INVENTION

Thus, a primary object of the present invention is to provide a metal-air fuel cell comprising an anode structure for providing an increased contact surface area between the zinc fuel plate and air for enhancing reaction speed and efficiency.

Another object of the present invention is to provide a metal-air fuel cell comprising an anode plate having a plurality of apertures to enhance the performance of the battery.

A further object of the present invention is to provide a metal-air fuel cell comprising an anode plate having a plurality of fins extending therefrom to enhance the performance of the battery.

To achieve the above objects, in accordance with the present invention, there is provided a metal-air fuel cell comprising an anode and a cathode with an electrolyte between the anode and the cathode. The anode includes a plate-like body made of a composite plate including a reaction layer, a reaction-enhancing layer and a collector layer. A plurality of fins are formed on and extending from a major surface of the plate-like body. A plurality of openings are selectively defined in the plate-like body in correspondence to the fins. The fins can be arranged in an array with fins in adjacent rows aligned with each other or offset with respect to each other. If desired, the plate can be made wavy.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
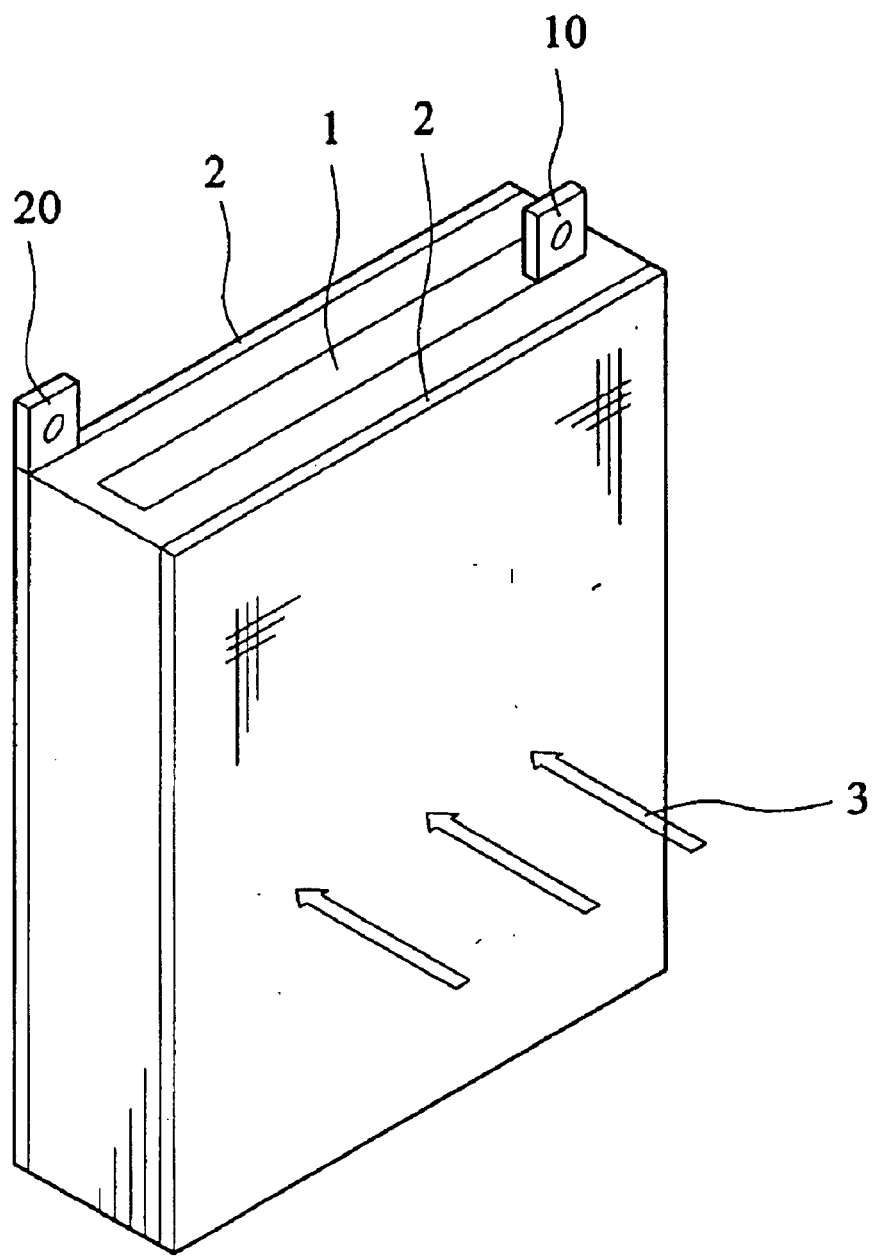
FIG. 1 is a perspective view of a conventional zinc-air battery.
Figure 2:
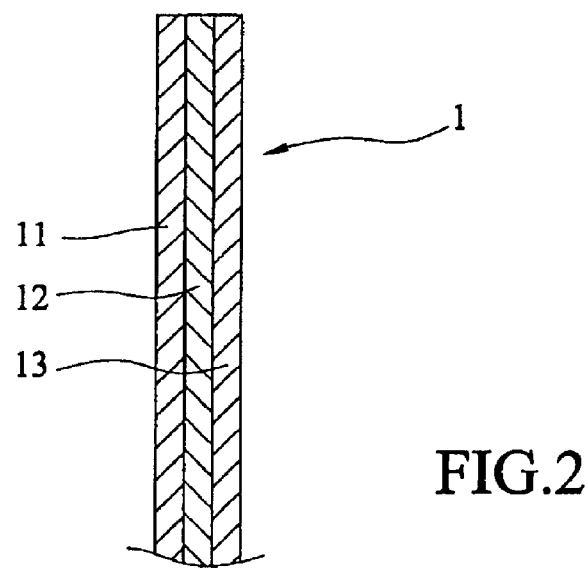
FIG. 2 is a cross-sectional view of an anode plate that is used to make an anode structure of a metal-air fuel cell in accordance with the present invention.

With reference to the drawings and in particular to FIG. 2, a composite plate constructed in accordance with the present invention for forming an anode structure of a metal-air fuel cell of the present invention is shown. The composite plate, which is designated with reference numeral 1 for simplicity, comprises a reaction layer 13 that is comprised of a metal for reaction with air in the discharging process of the battery. In the embodiment illustrated, the reaction layer 13 is made of zinc, aluminum, iron or magnesium. The composite plate 1 further comprises a reaction-enhancing layer 12 that is made of aluminum, zinc, magnesium, iron and similar metals and a collector layer 11 for collecting electrons released from the reaction between the metal and the air inside the battery. The collector layer 11 is preferably made of copper, silver or other high conductivity metals. The reaction-enhancing layer 12 is interposed between the collector layer 11 and the reaction layer 13.

Figure 3:
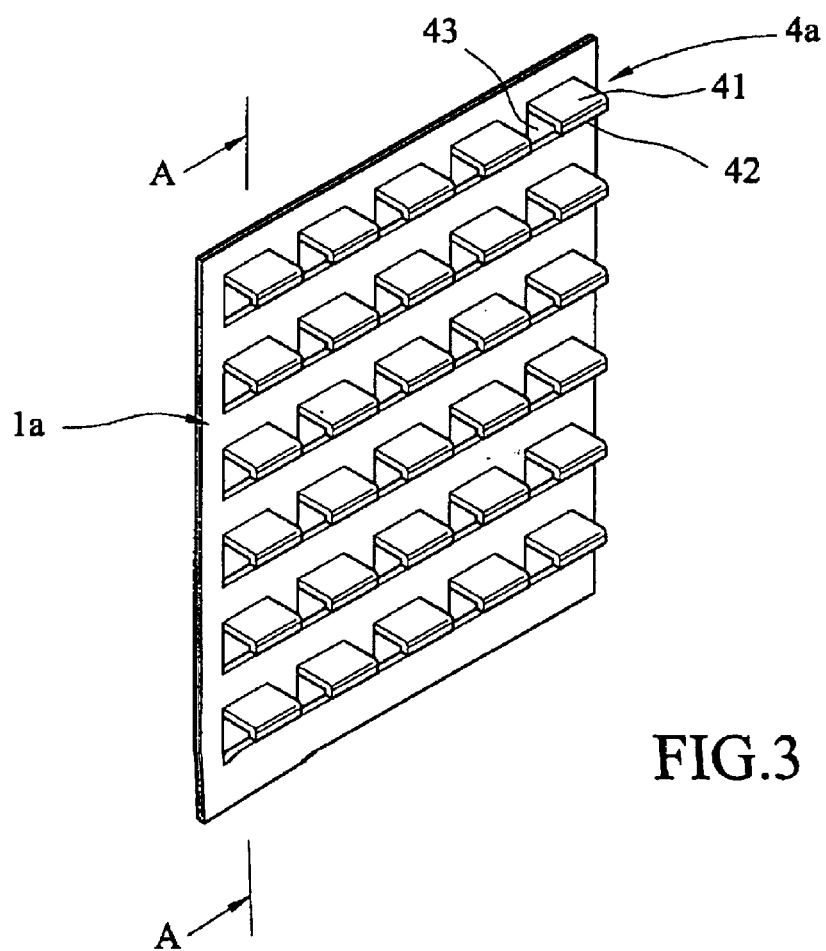
FIG. 3 is a perspective view of an anode structure of a metal-air fuel cell constructed in accordance with a first embodiment of the present invention.

Also referring to FIG. 3, an anode structure 1a constructed in accordance with a first embodiment of the present invention comprises a plate-like body made of the composite plate 1 of FIG. 2 and a plurality of fins 4a formed on and extending from a surface (not labeled) of the anode plate of the anode structure 1a. The fins 4a are spaced from each other for increasing contact area between the anode structure 1a and an electrolyte in which the anode structure 1a is positioned.

In the embodiment illustrated, the fins 4a are formed by stamping the plate body of the anode structure 1a. The stamping operation forms a plurality of openings 43 in the plate body. Such openings 43 allow the electrolyte to flow therethrough. In the embodiment illustrated, the openings 43 are rectangular.

Figure 4:
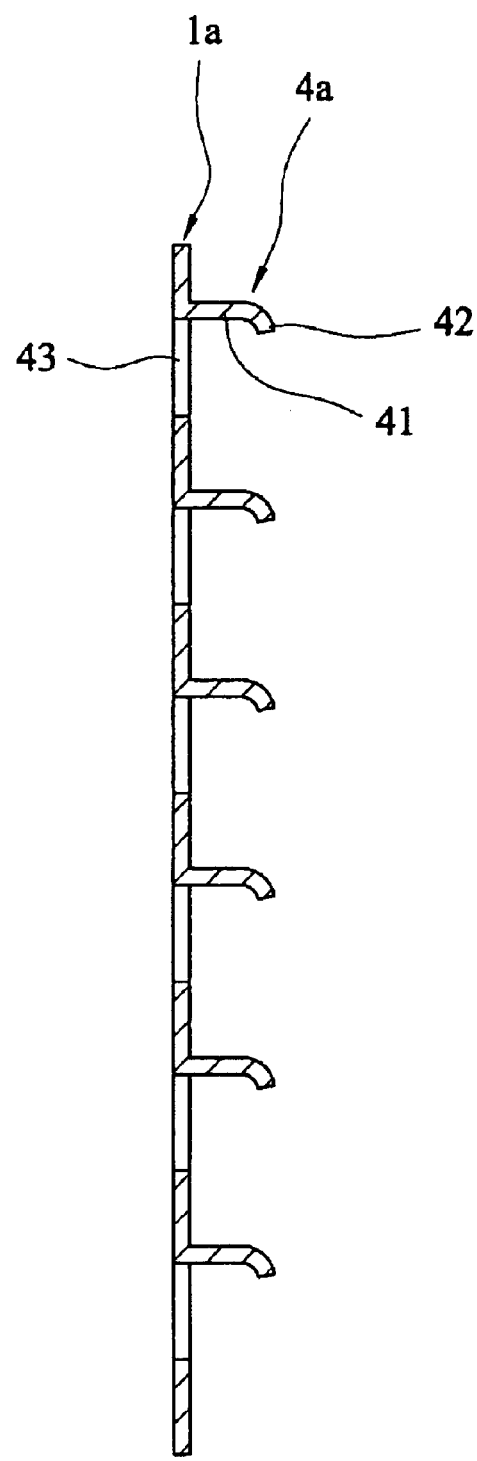
FIG. 4 is a cross-sectional view taken along line A—A of FIG. 3.

Also referring to FIG. 4, each fin 4a comprises a tab 41 extending substantially perpendicularly from the surface of the plate body and having a free end 42 that is bent or otherwise deformed. The tabs 41 that are formed by stamping the plate body have a shape corresponding to that of the openings 43. That is rectangular in the embodiment illustrated.

Figure 5:
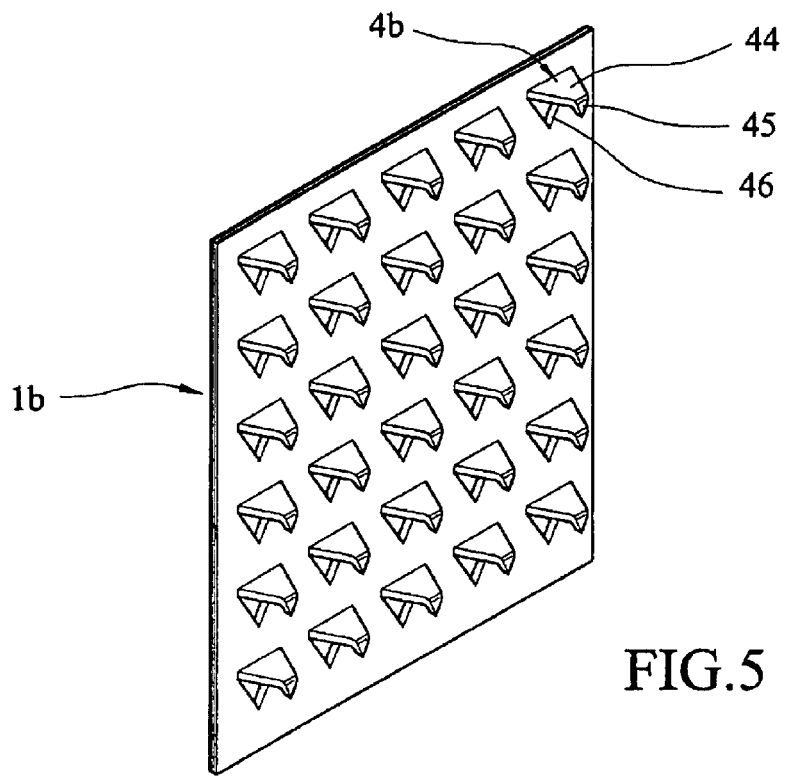
FIG. 5 is a perspective view of an anode structure of a metal-air fuel cell constructed in accordance with a second embodiment of the present invention.

FIG. 5 shows an anode structure 1b constructed in accordance with a second embodiment of the present invention. The anode structure 1b is made of the composite plate 1 of FIG. 2, preferably by stamping the plate 1. A plurality of triangular openings 46 are formed in the plate body by stamping which also forms a plurality of fins 4b extending from a surface of the plate body. Thus, each fin 4b comprises a triangular tab 44 extending from the plate body and having a free apex 45 that is bent or otherwise deformed.

Although in the embodiments discussed previously, the anode structure 1a, 1b is made of the composite plate shown in FIG. 2, it is apparent to those having ordinary skills to use separate plates for the reaction layer, the reaction-enhancing layer and the collector layer. All the separate plates are stamped individually to form the desired configuration. The individually-stamped plates are then attached to each other to form the composite structure of anode.

Figure 6:
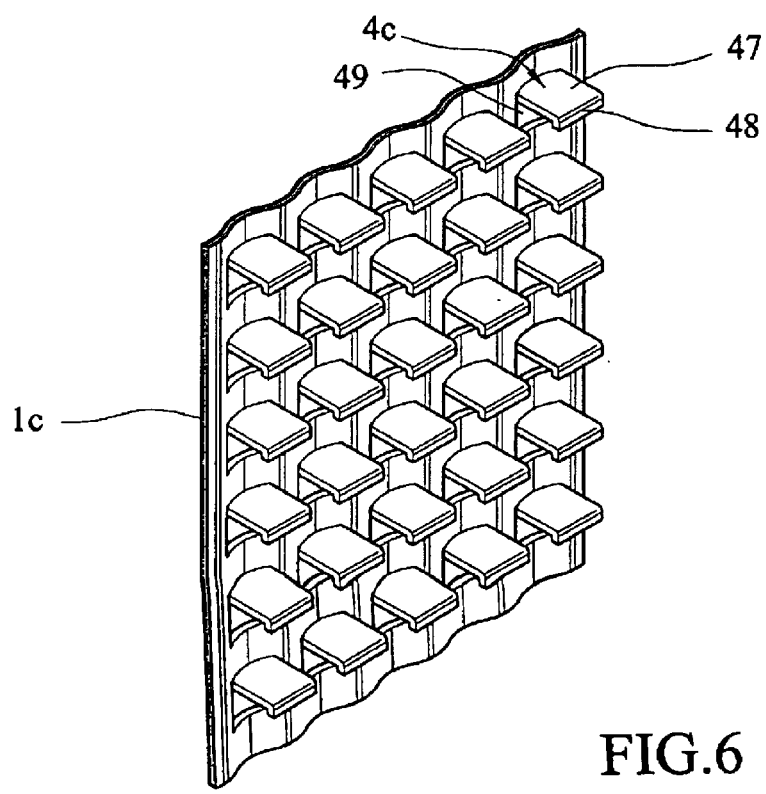
FIG. 6 is a perspective view of an anode structure of a metal-air fuel cell constructed in accordance with a third embodiment of the present invention.

FIG. 6 shows an anode structure 1c constructed in accordance with a third embodiment of the present invention. The anode structure 1c is made of the composite plate 1 of FIG. 2 or a single-layered plate made of the reaction layer material. However, the composite plate 1 is processed in advance to form a wavy plate. The wavy plate is then stamped to form a plurality of rectangular openings 49 in the wavy plate and a plurality of rectangular fins 4c on a major surface of the wavy plate. Each fin 4c comprises a rectangular tab 47 extending from the major surface of the wavy plate and a bent free end 48.

Figure 7:
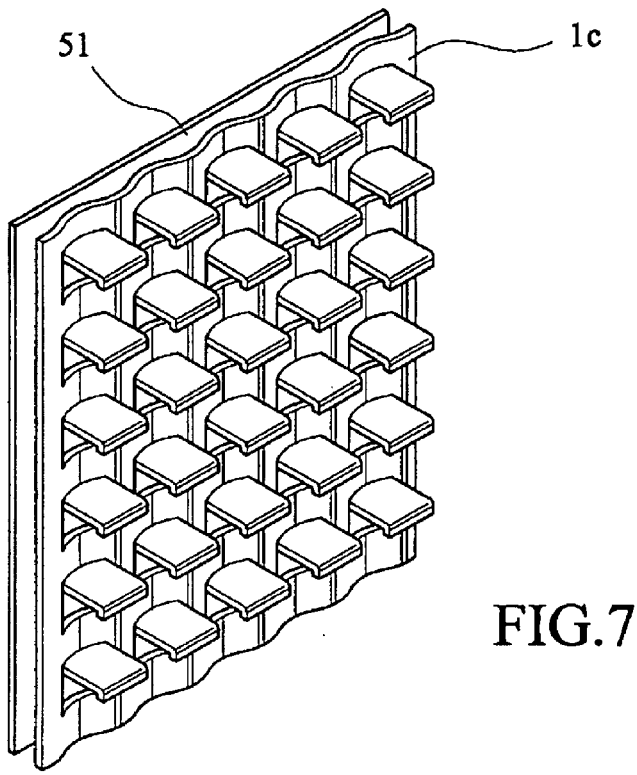
FIG. 7 is a perspective view of an anode structure of a metal-air fuel cell constructed in accordance with a fourth embodiment of the present invention.

FIG. 7 shows an anode structure constructed in accordance with a fourth embodiment of the present invention that is similar to the anode structure 1c of the third embodiment with an additional collector plate 51 attached to a surface thereof. Electrolyte can be filled in the space between the fins thereby increasing the contact area between the electrolyte and the anode structure. If desired, more than one such anode structure can be incorporated in a battery wherein the plate bodies of the anode structures can be substantially parallel to and spaced from each other. Electrolyte can be filled in the space between adjacent plate bodies.

Figure 8:
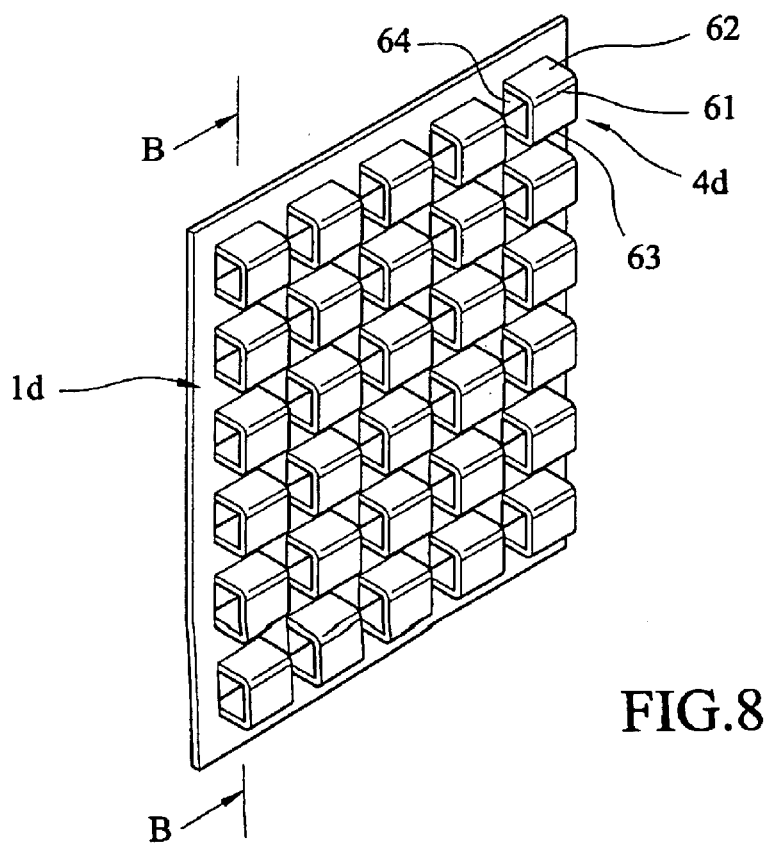
FIG. 8 is a perspective view of an anode structure of a metal-air fuel cell constructed in accordance with a fifth embodiment of the present invention.
Figure 9:
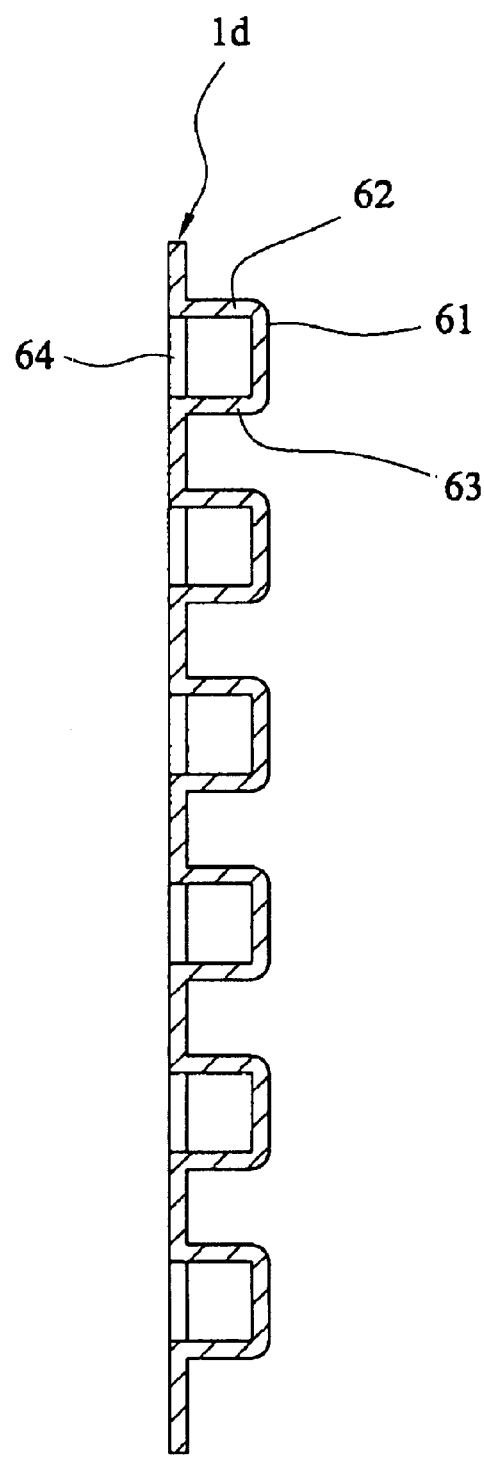
FIG. 9 is a cross-sectional view taken along line B—B of FIG. 8.

FIGS. 8 and 9 show an anode structure constructed in accordance with a fifth embodiment of the present invention.

The anode structure of the fifth embodiment, generally designated with reference numeral 1d, comprises a plate body which can be made of the composite plate 1 of FIG. 2 or a single-layered plate. A plurality of channel-like fins 4d arranged in a rectangular array is formed on a major surface of the plate body. The fins 4d are arranged to be substantially aligned with each other in adjacent rows of the array. Each fin 4d has a U-shaped cross section comprising two side tabs 62, 63 extending from the major surface of the plate body and an end tab 61 connected between free ends of the side tabs 62, 63. An opening 64 is defined in the plate body and is substantially opposite to the end tab 61 of each channel-like fin 4d.

Figure 10:
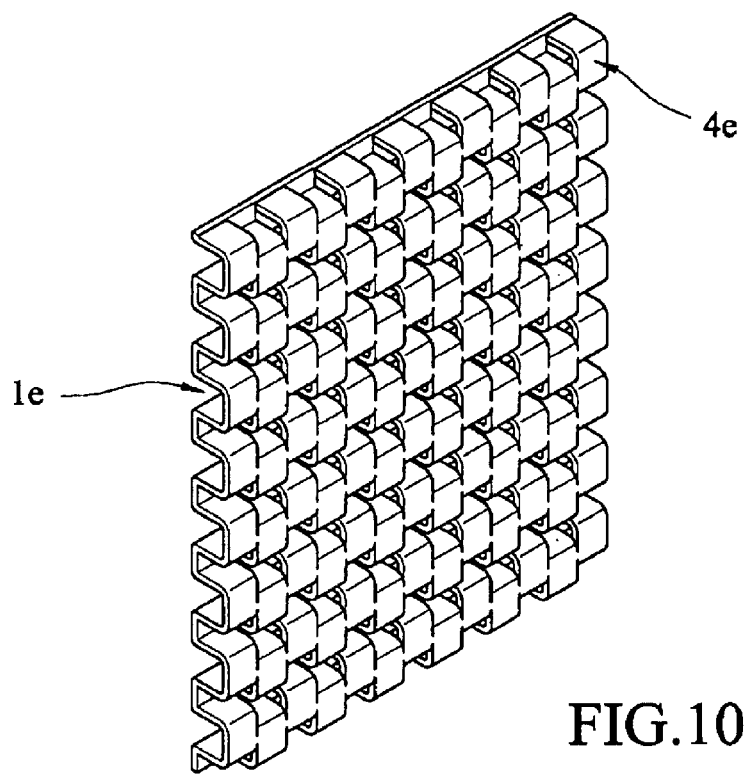
FIG. 10 is a perspective view of an anode structure of a metal-air fuel cell constructed in accordance with a sixth embodiment of the present invention.

FIG. 10 shows an anode structure constructed in accordance with a sixth embodiment of the present invention, generally designated with reference numeral 1e comprising a plate body and an array of channel-like fins 4e formed on a major surface of the plate body. The anode structure 1e of the sixth embodiment is substantially similar to the anode structure 1d with reference to FIGS. 8 and 9 with the only difference in that the fins 4 are offset with each other between adjacent rows of the array.

Figure 11:
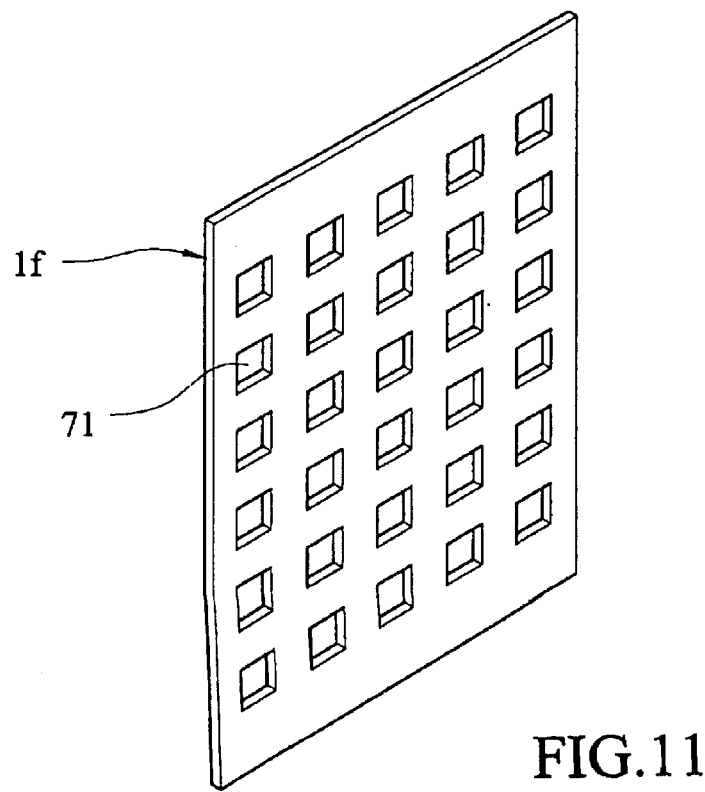
FIG. 11 is a perspective view of an anode structure of a metal-air fuel cell constructed in accordance with a seventh embodiment of the present invention.

FIG. 11 shows an anode structure constructed in accordance with a seventh embodiment of the present invention, generally designated with reference 1f, comprising a plate body that can be the composite plate 1 of FIG. 2 or a single-layered plate. A number of rectangular or square openings 71 are formed in the plate body for the flow of electrolyte of the battery. A number of such plate bodies are arranged in a battery with electrolyte filled between the flowing between the plate bodies for enhancing the reaction between the electrolyte and the anode structure. It is noted that the openings 71 may be in a triangular form.

Figure 12:
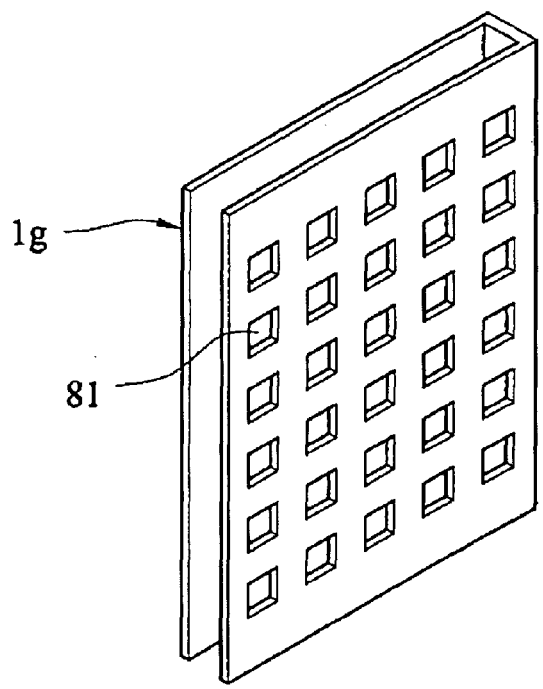
FIG. 12 is a perspective view of an anode structure of a metal-air fuel cell constructed in accordance with an eighth embodiment of the present invention.

FIG. 12 shows an anode structure constructed in accordance with an eighth embodiment of the present invention, generally designated with reference 1g, comprising a U-shaped plate body that can be the composite plate 1 of FIG. 2 or a single-layered plate. A number of rectangular or square openings 81 are formed in the plate body for the flow of electrolyte of the battery.

Figure 13:
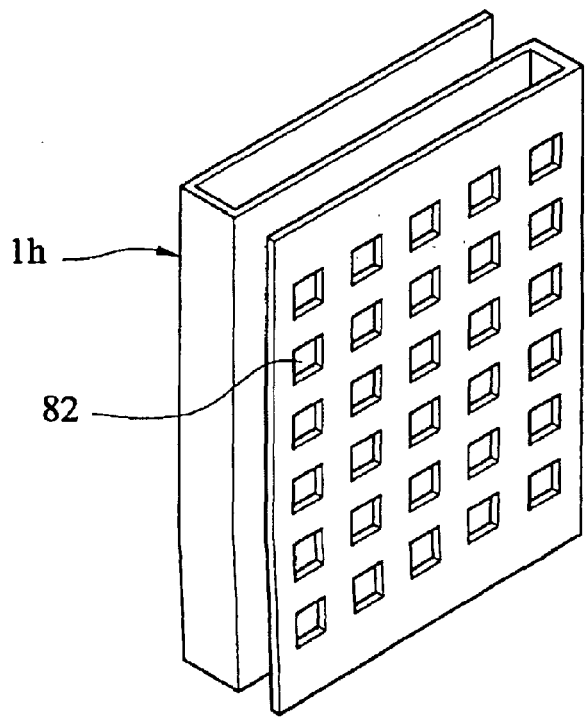
FIG. 13 is a perspective view of an anode structure of a metal-air fuel cell constructed in accordance with a ninth embodiment of the present invention.

FIG. 13 shows an anode structure constructed in accordance with an ninth embodiment of the present invention, generally designated with reference 1h, comprising a S-shaped plate body that can be the composite plate 1 of FIG. 2 or a single-layered plate. A number of rectangular or square openings 82 are formed in the plate body for the flow of electrolyte of the battery.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A metal-air fuel cell comprising:
   an anode comprising an anode plate and a plurality of fins formed on and extending from the anode plate;
   at least one cathode arranged in parallel to the anode plate; and
   an electrolyte between the anode and the cathode.

2. The metal-air fuel cell as claimed in claim 1, wherein the anode plate has a surface from which the fins extend, the plate defining an opening corresponding to each fin.

3. The metal-air fuel cell as claimed in claim 2, wherein each fin comprises a tab extending from the surface of the anode plate.

4. The metal-air fuel cell as claimed in claim 3, wherein the tab is substantially rectangular.

5. The metal-air fuel cell as claimed in claim 3, wherein the tab is substantially triangular.

6. The metal-air fuel cell as claimed in claim 1, wherein the anode plate comprises a wavy plate having a surface from which the fins extend.

7. The metal-air fuel cell as claimed in claim 1, wherein the anode plate comprises a composite plate having a reaction layer and a collector layer with a reaction-enhancing layer interposed between the reaction layer and the collector layer.

8. The metal-air fuel cell as claimed in claim 7, wherein the collector layer is made of a material selected from a group consisting of copper and silver.

9. The metal-air fuel cell as claimed in claim 7, wherein the reaction-enhancing layer is made of a material selected from a group consisting of aluminum, zinc, magnesium and iron.

10. The metal-air fuel cell as claimed in claim 7, wherein the reaction layer is made of a material selected from a group consisting of aluminum, zinc, magnesium and iron.

11. The metal-air fuel cell as claimed in claim 1, wherein the anode plate comprises a plate and wherein the fins are channel-like and are arranged in an array on the plate, the channel-like fins being substantially aligned with each other between adjacent rows of the array.

12. The metal-air fuel cell as claimed in claim 1, wherein the anode plate comprises a plate and wherein the fins are channel-like and are arranged in an array on the plate, the channel-like fins being offset with respect to each other between adjacent rows of the array.

13. The metal-air fuel cell as claimed in claim 1, wherein the anode plate is shaped to have a U-shaped cross-sectional contour.

14. The metal-air fuel cell as claimed in claim 1, wherein the anode plate is shaped to have an S-shaped cross-sectional contour.

15. A metal-air fuel cell comprising:

an anode comprising an anode plate having an array of a plurality of openings formed through the anode plate, the plurality of openings being arranged in longitudinal rows and transverse columns, the array of openings in the rows and the columns being substantially equally spaced one from another;

at least one cathode arranged in parallel to the anode plate; and an electrolyte between the anode and the cathode, the electrolyte passing through the plurality of openings of the anode plate.

16. The metal-air fuel cell as claimed in claim 15, wherein the anode plate is shaped to have a U-shaped cross-sectional contour.

17. The metal-air fuel cell as claimed in claim 15, wherein the anode plate is shaped to have an S-shaped cross-sectional contour.

* * * * *